United States Patent
Dubout et al.

(10) Patent No.: US 10,380,766 B2
(45) Date of Patent: *Aug. 13, 2019

(54) METHOD AND APPARATUS FOR AUTOMATIC INTRINSIC CAMERA CALIBRATION USING IMAGES OF A PLANAR CALIBRATION PATTERN

(71) Applicant: Second Spectrum, Inc., Los Angeles, CA (US)

(72) Inventors: Charles Xavier Quentin Dubout, Ecublens (CH); Horesh Beny Ben Shitrit, Echichens (CH)

(73) Assignee: Second Spectrum, Inc., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/294,484

(22) Filed: Mar. 6, 2019

(65) Prior Publication Data

US 2019/0197732 A1 Jun. 27, 2019

Related U.S. Application Data

(63) Continuation of application No. 15/970,965, filed on May 4, 2018.

(Continued)

(51) Int. Cl.
*G06K 9/46* (2006.01)
*G06K 9/62* (2006.01)
*G06T 7/80* (2017.01)

(52) U.S. Cl.
CPC .............. *G06T 7/80* (2017.01); *G06K 9/4604* (2013.01); *G06K 9/6211* (2013.01)

(58) Field of Classification Search
CPC ................................ G06T 7/80; G06K 9/4604
See application file for complete search history.

(56) References Cited

U.S. PATENT DOCUMENTS

| 7,085,322 B2 | 8/2006 | Ngai et al. |
| 7,143,083 B2 | 11/2006 | Carlbom et al. |

(Continued)

FOREIGN PATENT DOCUMENTS

| KR | 20160118183 A | 10/2016 |
| WO | 2013166456 A2 | 11/2013 |

(Continued)

OTHER PUBLICATIONS

Zhang, Shengyou, (2008), A flexible New Technique for Camera Calibration, MSR-TR-98-71, Microsoft Research, Redmond, WA (Year: 2008).*

(Continued)

*Primary Examiner* — Dwayne D Bost
*Assistant Examiner* — Menatoallah Youssef
(74) *Attorney, Agent, or Firm* — GTC Law Group PC & Affiliates

(57) ABSTRACT

The present disclosure relates to a high precision method, model, and apparatus for calibrating the intrinsic camera parameter values of one or more intrinsic parameters of a camera. The intrinsic parameters include focal lengths, skew, optical center, and radial distortion coefficients. The practical implementation of the solution consists of a camera capturing several images of a planar calibration pattern from different viewpoints, and a computer implemented processing pipeline. The solution does not require additional human input and is robust to misdetection of the calibration pattern in some of the images.

30 Claims, 5 Drawing Sheets

Related U.S. Application Data

(60) Provisional application No. 62/501,579, filed on May 4, 2017.

(56) References Cited

U.S. PATENT DOCUMENTS

| | | | |
|---|---|---|---|
| 7,796,155 | B1 | 9/2010 | Neely et al. |
| 7,932,923 | B2 | 4/2011 | Lipton et al. |
| 8,620,077 | B1 | 12/2013 | Kwatra et al. |
| 9,740,977 | B1 | 8/2017 | Moon et al. |
| 2003/0093810 | A1 | 5/2003 | Taniguchi et al. |
| 2008/0193016 | A1 | 8/2008 | Lim et al. |
| 2008/0312010 | A1 | 12/2008 | Marty et al. |
| 2012/0133780 | A1 | 5/2012 | Zhang et al. |
| 2013/0147948 | A1* | 6/2013 | Higuchi ............... H04N 17/002 348/135 |
| 2013/0169822 | A1 | 7/2013 | Zhu et al. |
| 2013/0182119 | A1 | 7/2013 | Eledath et al. |
| 2013/0243250 | A1 | 9/2013 | France et al. |
| 2014/0037140 | A1 | 2/2014 | Benhimane et al. |
| 2014/0058992 | A1 | 2/2014 | Lucey et al. |
| 2014/0135959 | A1 | 5/2014 | Thurman et al. |
| 2014/0168378 | A1 | 6/2014 | Hall |
| 2015/0103147 | A1 | 4/2015 | Ho et al. |
| 2015/0248917 | A1 | 9/2015 | Chang |
| 2015/0288951 | A1 | 10/2015 | Mallet et al. |
| 2016/0007912 | A1 | 1/2016 | Hu et al. |
| 2017/0238055 | A1 | 8/2017 | Chang et al. |
| 2017/0255826 | A1 | 9/2017 | Chang et al. |
| 2017/0255827 | A1 | 9/2017 | Chang et al. |
| 2017/0255828 | A1 | 9/2017 | Chang et al. |
| 2017/0255829 | A1 | 9/2017 | Chang et al. |
| 2018/0322657 | A1 | 11/2018 | Dubout et al. |

FOREIGN PATENT DOCUMENTS

| | | |
|---|---|---|
| WO | 2015060691 A1 | 4/2015 |
| WO | 2015/131084 A1 | 9/2015 |
| WO | 2018053257 A1 | 3/2018 |
| WO | 2018204746 A1 | 11/2018 |

OTHER PUBLICATIONS 15754985.8, "European Application Serial No. 15754985.8, Extended European Search Report Received dated Nov. 15, 2017", Second Spectrum, Inc., 10 Pages.

Kang, et al., "Detection of Calibration Patterns for Camera Calibration with Irregular Lighting and Complicated Backgrounds", International Journal of Control, Automation, and Systems 6.5 (2008), Oct. 2008, pp. 746-754.

Kim, "Automatic Classification of Offensive Patterns for Soccer Game Highlights Using Neural Networks", Malaysian Journal of Computer Science, XP055422797, Retrieved from the Internet: URL:http://citeseerx.ist.psu.edujviewdocjdownload?doi=I0.1.1.630.7271&rep=rep1&type=pdf, Jun. 1, 2002, p. 57-67.

PCT/US18/31025, "International Application Serial No. PCT/US18/31025, International Search Report and Written Opinion dated Sep. 10, 2018", Second Spectrum, Inc., 10 pages.

PCT/US2015/018077, "International Application Serial No. PCT/US2015/018077, International Preliminary Report on Patentability and Written Opinion dated Sep. 15, 2016", Second Spectrum, Inc., 9 Pages.

PCT/US2015/018077, "International Application Serial No. PCT/US2015/018077, International Search Report and Written Opinion dated May 27, 2015", Second Spectrum, Inc., 13 pages.

PCT/US2017/051768, "International Application Serial No. PCT/US2017/051768, Invitation to Pay Additional Fees and, Where Applicable, Protest Fee dated Nov. 29, 2017", Second Spectrum, Inc., 7 pages.

PCT/US2017/051768, "International Application Serial No. PCT/US2017/051768, International Search Report and Written Opinion dated Feb. 28, 2018", Second Spectrum, Inc., 33 Pages.

Zhang, "A flexible New Technique for Camera Calibration", (2008) MSR-TR-98-71, Microsoft Research, Redmond, WA, 2008, pp. 1-21.

* cited by examiner

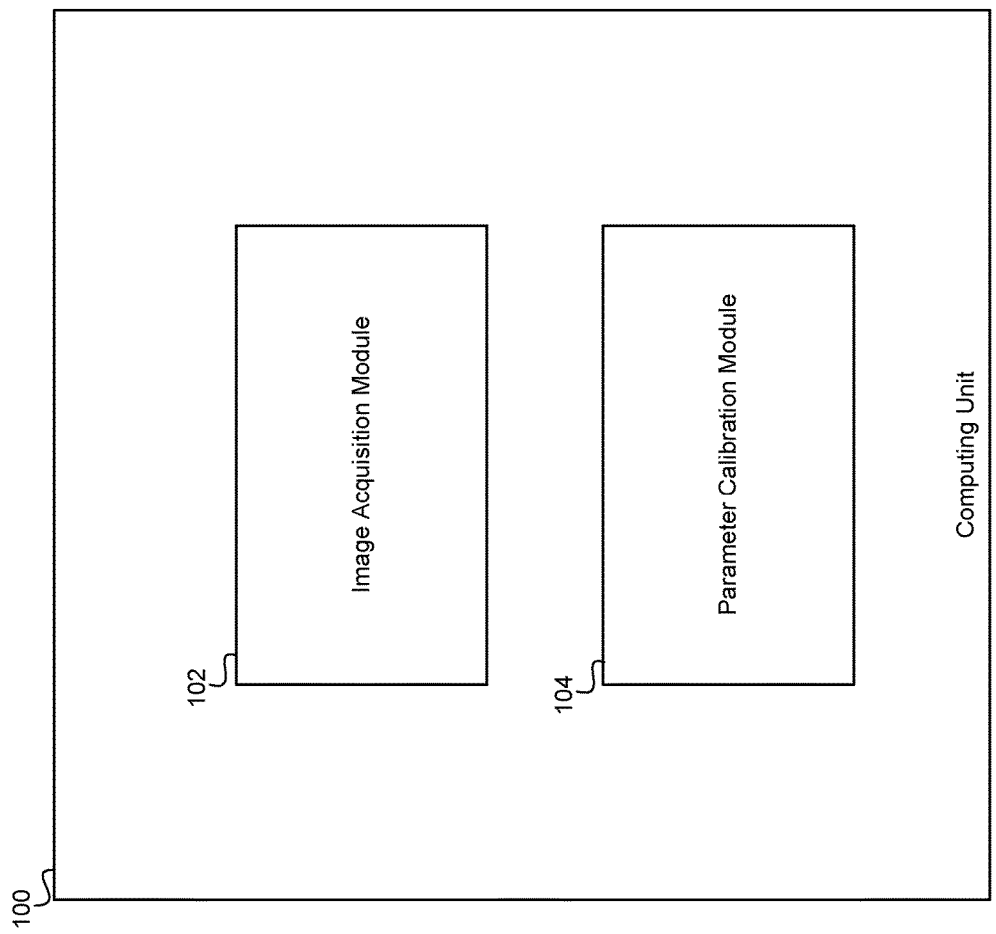

METHOD AND APPARATUS FOR AUTOMATIC INTRINSIC CAMERA CALIBRATION USING IMAGES OF A PLANAR CALIBRATION PATTERN

CROSS-REFERENCE TO RELATED APPLICATIONS

This application is a continuation of U.S. patent application Ser. No. 15/970,965 filed May 4, 2018. U.S. patent application Ser. No. 15/970,965 claims the benefit of U.S. provisional patent application Ser. No. 62/501,579 filed May 4, 2017, which is incorporated herein by reference in its entirety.

FIELD

The present disclosure relates to a high precision method, model, and apparatus for calibrating the intrinsic parameter values of one or more intrinsic camera parameters of an image capture device for use in a machine vision system. The intrinsic camera parameters may include focal lengths, skew, optical center, and radial distortion coefficients.

SUMMARY

The practical implementation of the solution includes a camera capturing several images of a planar calibration pattern from different viewpoints, and a computer implemented processing pipeline. The solution does not require additional human input and is robust to misdetection of the calibration pattern in some of the images. The disclosure refers as well to a computer program embodied on a computer medium which, when executed by a processor, performs all the method steps.

According to some embodiments of the present disclosure, a method for automatic camera calibration of an image capture device is disclosed. The method includes obtaining, by a computing unit, a plurality of images of a planar calibration pattern captured by the image capture device from different respective angles. The method also includes detecting, by the computing unit, a plurality of distinguishable features depicted in the planar calibration pattern for each obtained image. The method further includes for each image, generating, by the computing unit, a respective lattice graph corresponding to the image based on the distinguishable features detected from the image. Each respective lattice graph has a plurality of nodes. The method further includes repeatedly calibrating, by the computing unit, a plurality of intrinsic camera parameter values corresponding to one or more intrinsic camera parameters of the image capture device based on two or more distinguishable features detected in two or more of the images and the lattice graphs corresponding to the two or more images. The calibrating is performed for two or more different combinations of the images. The method further includes selecting, by the computing unit, one or more intrinsic camera parameter values from the plurality of intrinsic camera parameter values. The one or more intrinsic camera parameter values are selected to minimize a robust estimator of a reprojection error over the obtained plurality of images. The method further includes refining, by the computing unit, calibration of the plurality of intrinsic camera parameter values based on the one or more selected intrinsic camera parameters.

According to some embodiments, the method further includes repeatedly calibrating a plurality of extrinsic camera parameter values using two and three-dimensional correspondences for the calibration images and the plurality of intrinsic camera parameter values. The calibrating is performed for two or more different combinations of obtained images.

According to some embodiments, obtaining the plurality of images includes obtaining a video containing the plurality of images. According to some embodiments, the plurality of images is a series of standstill images.

According to some embodiments, the plurality of images is captured by the image capture device, wherein the computing unit is contained in a form factor of the image capture device.

According to some embodiments, the plurality of images is captured by the image capture device and received by the computing unit via a network.

According to some embodiments, detecting the plurality of distinguishable features includes, for each image, performing a blob detection process on the image. In some embodiments, the blob detection process may be Laplacian of Gaussian. In some embodiments, the blob detection process is Maximally Stable Extremum Regions.

According to some embodiments, each node of the lattice graph is based on a respective center of a respective distinguishable feature of the plurality of distinguishable features.

According to some embodiments, refining the plurality of intrinsic camera parameter values is further based on all images of the plurality of obtained images that correspond to the one or more selected intrinsic camera parameter values.

According to some embodiments, the method further includes configuring the one or more intrinsic camera parameters of the image capture device in accordance with the refined plurality of intrinsic camera parameter values.

According to some embodiments, the one or more intrinsic parameters include focal lengths, skew, optical center, and/or radial distortion coefficients.

According to some embodiments of the present disclosure, a computing unit configured for automatic camera calibration of an image capture device is disclosed. The computing unit comprises memory storing a plurality of computer-executable instructions and one or more processors that execute the computer-executable instructions. The computer-executable instructions cause the one or more processors to obtain a plurality of images of a planar calibration pattern captured by the image capture device from different respective angles. The computer-executable instructions further cause the one or more processors to detect a plurality of distinguishable features depicted in the planar calibration pattern for each obtained image and generate a lattice graph having a plurality of nodes based on the distinguishable features detected from each image. The computer-executable instructions further cause the one or more processors to repeatedly calibrate a plurality of intrinsic camera parameter values corresponding to one or more intrinsic camera parameters of the image capture device based on two or more distinguishable features detected in two or more of the images and the lattice graphs corresponding to the two or more images. The calibrating is performed for two or more different combinations of the images. The computer-executable instructions further cause the one or more processors to select one or more intrinsic camera parameter values from the plurality of intrinsic camera parameter values. The one or more intrinsic camera parameter values are selected to minimize a robust estimator of a reprojection error over the obtained plurality of images. The computer-executable instructions further cause the one or more processors to refine calibration of the plurality of intrinsic camera parameter values based on the one or more selected intrinsic camera parameters.

According to some embodiments, the computer-executable instructions further cause the one or more processors to repeatedly calibrate a plurality of extrinsic camera parameter values using two and three-dimensional correspondences for the calibration images and the plurality of intrinsic camera parameter values. The calibrating is performed for two or more different combinations of obtained images.

According to some embodiments, obtaining the plurality of images includes obtaining a video containing the plurality of images. According to some embodiments, the plurality of images is a series of standstill images.

According to some embodiments, the plurality of images is captured by the image capture device, wherein the computing unit is contained in a form factor of the image capture device.

According to some embodiments, the plurality of images is captured by the image capture device and received by the computing unit via a network.

According to some embodiments, detecting the plurality of distinguishable features includes, for each image, performing a blob detection process on the image. In some embodiments, the blob detection process may Laplacian of Gaussian. In some embodiments, the blob detection process is Maximally Stable Extremum Regions.

According to some embodiments, each node of the lattice graph is based on a respective center of a respective distinguishable feature of the plurality of distinguishable features.

According to some embodiments, refining the plurality of intrinsic camera parameter values is further based on all images of the plurality of obtained images that correspond to the one or more selected intrinsic camera parameter values.

According to some embodiments, the computer-executable instructions further cause the one or more processors to configure the one or more intrinsic camera parameters of the image capture device in accordance with the refined plurality of intrinsic camera parameter values.

According to some embodiments, the plurality of intrinsic parameters includes focal lengths, skew, optical center, and/or radial distortion coefficients A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings:

FIG. 1 is a schematic illustrating a computing unit that executes an image acquisition module and a camera parameter calibration module according to some embodiments of the present disclosure.

DETAILED DESCRIPTION

The apparatus that is disclosed in this patent application includes a planar calibration pattern and a computer unit. The acquired images of the pattern are used as input to the novel calibration process that uses the acquired images to estimate the intrinsic camera parameter values of one or more intrinsic camera parameters of an image capture device. The one or more intrinsic camera parameters may include, but are not limited to, focal lengths, skew, optical center, and radial distortion coefficients.

FIG. 1 illustrates an example of a computing unit 100. The computing unit 100 may include one or more processors and memory. The processors may execute in an individual or distributed manner. The computing unit 100 may execute computer-executable instructions that are stored in the memory. In embodiments, the computing unit 100 executes an image acquisition module 102 and a parameter calibration module 104. The computing unit 100 may be integrated in an image capture device (e.g., a camera, a smartphone, a video camera, and the like) or may be integrated on a computing device that is compatible (e.g., connectable) to an image capture device.

In embodiments, the computing unit 100 is integrated in the image capture device. In these embodiments, the image acquisition module 102 receives captured images directly from a camera module (not shown) of the image capture device. In embodiments, the computing unit 100 is integrated on a computing device that is compatible with the image capture device. In these embodiments, the computing unit 100 may be connected to the image capture device either via a wired or wireless communication link. In these embodiments, the image capture device may capture images and may provide the images to the image acquisition module 102 via the communication link.

Figure 2C:
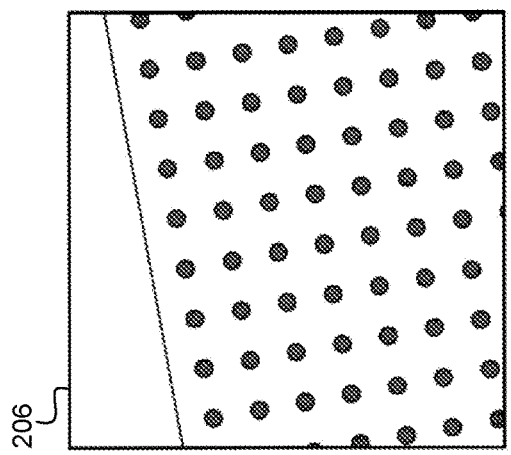
FIGS. 2A-2C are schematics illustrating three different calibration images of a planar calibration pattern according to some embodiments of the present disclosure.
Figure 2B:
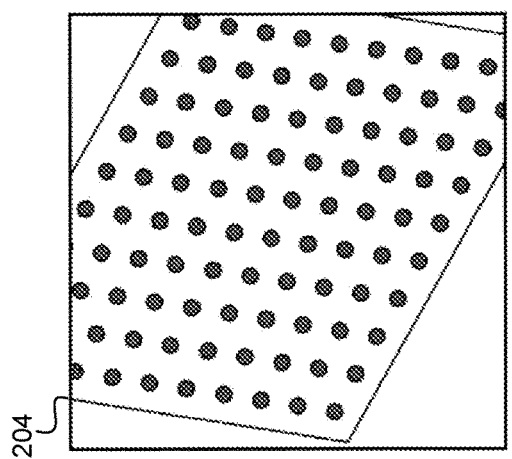
Figure 2A:
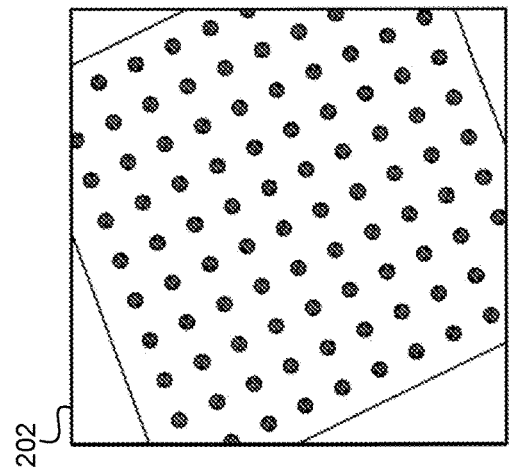

In embodiments, the image acquisition module 102 obtains a set of calibration images (or "images) of a planar calibration pattern taken at different angles. FIGS. 2A-2C illustrate an example of calibration images of a planar calibration pattern. FIG. 2A illustrates a first image 202 captured by from a first viewing angle. FIG. 2B illustrates a second image 204 captured from a second viewing angle. FIG. 2C illustrates a third image 206 captured from a third viewing angle. The planar calibration pattern includes features distinguishable using machine vision techniques. In certain examples, these features should not be connected and should be organized regularly, centered in the polygons of a regular tiling, so that their centers are at the nodes of a lattice graph. In the illustrated examples, the features are repeating dots. It is understood that capturing images from different respective angles may include adjusting the orientation and/or position of an image capture device with respect to the planar calibration pattern, adjusting the orientation and/or position of the planar calibration pattern with respect to the image capture device, or a combination of adjusting the position and/or orientation of the image capture device and a position and/or orientation of the planar calibration pattern.

In embodiments, the calibration images are first manually acquired by the image capture device whose intrinsic parameter values are sought. The calibration images capture the planar calibration patterns from different viewpoints, through rotations and translations of the image capture device and/or the planar calibration pattern. The process can be more conveniently done by capturing a video and using some or all of the video frames as calibration images. Not all images need to capture the planar calibration pattern in its integrality or even to capture it at all. In embodiments, the planar calibration pattern is never seen in its integrality, as long as the union of the visible planar calibration pattern's parts covers the image entirely.

Figure 3C:
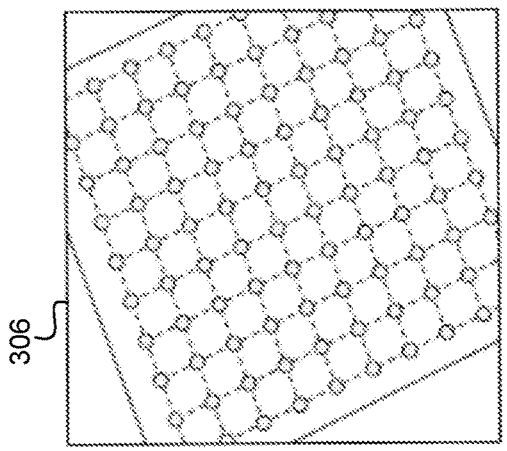
FIGS. 3A-3C are schematics illustrating three steps of a planar calibration pattern analysis according to some embodiments of the present disclosure.
Figure 3B:
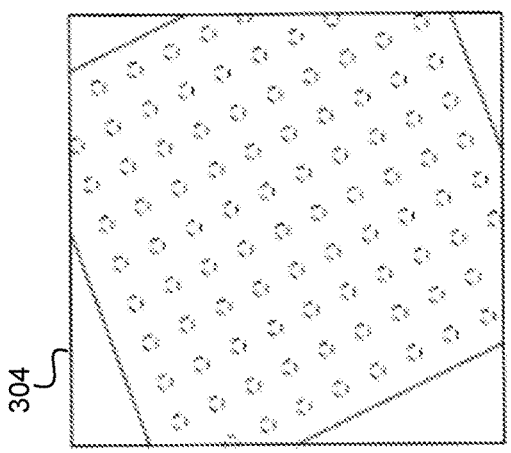
Figure 3A:
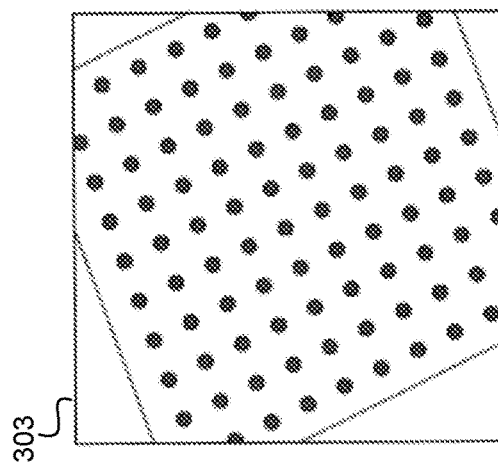

After the calibration images have been acquired and transferred to image acquisition module 102, the parameter calibration module 104 may perform planar calibration pattern analysis on the acquired images 102, 104, 106. FIGS. 3A-3C illustrate the three example stages of the planar calibration pattern analysis. FIG. 3A shows a calibration image acquired by a hypothetical user similarly as in FIGS. 2A-2C. FIG. 3B shows with dotted circles the result of the distinguishable feature detection using a machine vision technique. FIG. 3C shows with dashed lines the edges of the automatically reconstructed lattice graph whose nodes are the distinguishable features' centers.

In operation, the parameter calibration module 104 may detect the centers of the distinguishable features in every calibration image 102, 104, 106 using a machine vision technique. As an example, the black dots used as distinguishable features in the figures can be detected using a blob detector. In embodiments, the parameter calibration module 104 may implement blob detection techniques such as the Laplacian of Gaussian (LoG) or the Maximally Stable Extremum Regions (MSER) algorithm. In embodiments, the machine vision technique may output, for each calibration image 102, 104, 106, a list of candidate two-dimensional positions corresponding to the detected features. FIG. 3C illustrates an example output 306 of the machine-vision technique. In the example output 306, the output depicts a starting candidate two-dimensional detection (e.g., dotted circle) and initial edge vectors (e.g., arrows). Such lists may contain errors such as missed detections or detection of features not part of the planar calibration pattern, which the parameter calibration module 104 may deal with later in the processing pipeline.

After the detection of the distinguishable features' centers, the parameter calibration module 104 may reconstruct a lattice graph that supports the distinguishable features' centers in every calibration image. The reconstruction may be robust to the errors made in the previous step as well as to the distortions introduced by the perspective projection and the camera lens. To that end, the parameter calibration module 104 may implement the RANSAC algorithm. The reconstruction may be performed multiple times, where each reconstruction may begin from a different starting point. After multiple iterations, the parameter calibration module 104 may select and retain the best reconstruction. For each candidate starting two-dimensional detection, the parameter calibration module 104 may compute the n-closest neighbors, where n is the degree of the lattice graph (n can be 4 for the grid of the figures). These neighbors are then sorted with respect to the angle they make relative to the candidate starting two-dimensional detection. The vectors between the neighbors and the starting detection are saved as initial edge vectors.

Figure 4C:
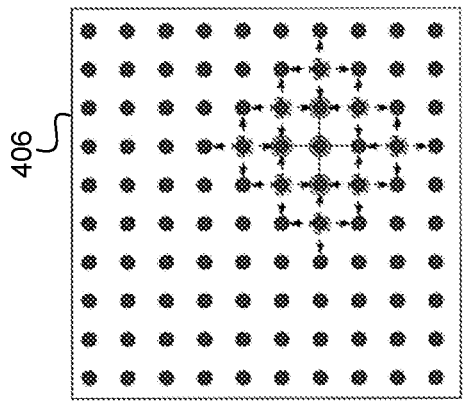
FIGS. 4A-4C are schematics illustrating three steps of a lattice graph reconstruction process according to some embodiments of the present disclosure.
Figure 4B:
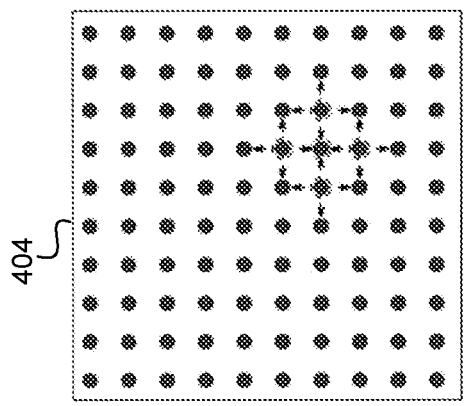
Figure 4A:
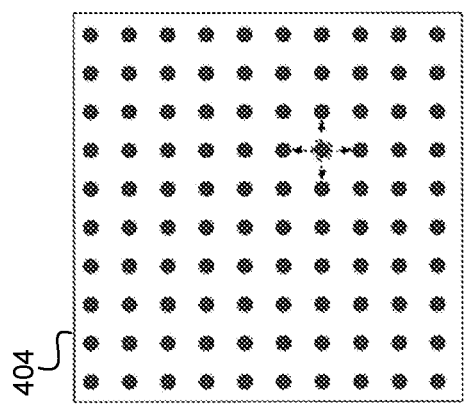

The parameter calibration module 104 may proceed recursively, with each recursion being given as input a current two-dimensional detection, n edge vectors, and a list of already visited detections. The initial recursion starts with the candidate starting two-dimensional detection, the initial edge vectors, and an empty list, as shown in FIG. 4A. Each recursion marks the current two-dimensional detection as visited by adding it to the list. The parameter calibration module 104 may then select the n-closest neighbors to the addition of the current two-dimensional detection plus each edge vector. The parameter calibration module 104 may update the edge vectors to be the vectors between the newly selected n-closest neighbors and the current two-dimensional detection. The parameter calibration module 104 may then recursively explore the neighbors if the neighbors have not been already explored (i.e., if the neighbors are not in the list of already visited detections). The recursion can terminate when the parameter calibration module 104 cannot find any neighbors that have not already been visited. The parameter calibration module 104 may then reconstruct the lattice graph from the recursion, whereby each visited neighbor corresponds to a well-defined direction relative to the initial edge vectors. The beginning of the recursion is illustrated in FIGS. 4A-4C. FIG. 4A shows a candidate starting two-dimensional detection (dotted circle) and initial edge vectors (arrows), connecting the detection to its n-closest neighbors. FIG. 4B shows the first level of the recursion with new edge vectors (arrows). FIG. 4C shows the second level of the recursion with new edge vectors (arrows).

In embodiments, the parameter calibration module 104 may implement heuristics to increase the robustness of the reconstruction. In some embodiments, the parameter calibration module 104 may only take into consideration neighbors resembling the current detection in terms of shape, size, and/or color. Additionally or alternatively, symmetries of the graph can be exploited, for example by averaging the left/right and up/down vectors of FIGS. 4A-4C. In the end, the parameter calibration module 104 may retain only the lattice graph with the largest number of nodes. Despite all these precautions, it might happen that the reconstructed lattice graph does not correspond (is not a subset of) the real graph underlying the positions of the distinguishable features' centers on the planar calibration pattern. The next step of the processing pipeline thus needs to be robust to some of the reconstructed lattice graphs not corresponding to the reality.

After the reconstruction of the lattice graph for every calibration image, the parameter calibration module 104 may estimate an initial version of the intrinsic camera parameter values of one or more intrinsic camera parameters of the image capture device. To make this initial estimation robust to the errors made in the previous step, the parameter calibration module 104 may again implement the RANSAC algorithm. The parameter calibration module 104 may perform estimation multiple times, each time using only a small subset of the calibration images chosen at random. After the selection of a few of the calibration images, the parameter calibration module 104 may estimate the intrinsic camera parameter values using a computer vision algorithm, taking as input a set of two-dimensional and three-dimensional correspondences for a number of images. The parameter calibration module 104 may derive these correspondences from the lattice graphs reconstructed in the previous step. Indeed, both a two-dimensional position (in the image coordinate system) and a three-dimensional position (in the planar calibration pattern coordinate system) can be associated to every node of every reconstructed lattice graph. In embodiments, the two-dimensional component is the distinguishable features' center. The parameter calibration module 104 may derive a three-dimensional component from the position of the node in the lattice graph with respect to a node arbitrarily chosen as the origin. As the calibration pattern is planar, the parameter calibration module 104 may set one of the three coordinates to zero and may compute the other two coordinates from the path in the lattice graph between the arbitrary origin and the node. The arbitrary choice of the origin of the lattice graph in each calibration image does not matter to the intrinsic camera parameters' estimation, since the exact origin location may only affect the extrinsic camera parameter values of one or more extrinsic camera parameters of the image capture device.

After each intrinsic camera parameters estimation trial, the parameter calibration module 104 may compute a quality of the estimation as follows. First, the parameter calibration module 104 may solve for the extrinsic camera parameter values of one or more extrinsic camera parameters of the image capture device using the same two and three-dimensional correspondences for every calibration image and the recovered intrinsic camera parameter values. It is noted that the parameter calibration module 104 may utilize additional or alternative suitable techniques and/or features for calibrating/solving for the extrinsic camera parameter values. In embodiments the recovered intrinsic camera parameter values may be the current intrinsic camera parameter values of one or more intrinsic camera parameters of the image capture device. The parameter calibration module 104 may then calculate the reprojection error for each calibration image. The parameter calibration module 104 may use as a quality measure a suitable robust estimator of the reprojection error (e.g., the median of all the errors). In embodiments, the estimator is a robust estimator, as some of the lattice graphs might not correspond to the reality and therefore have a singularly high reprojection error.

The next step of the processing pipeline starts from the optimal intrinsic camera parameter values found in the previous step. The parameter calibration module 104 may then select any calibration images with a reprojection error lower than some threshold. In some embodiments, the threshold may be a few times (e.g., 2× or 3×) the quality measure of the previous step. The parameter calibration module 104 may then re-estimate the intrinsic camera parameter values based on the selected calibration images using the same correspondences as in the previous step. Once completed, the parameter calibration module 104 may output the re-estimated intrinsic camera parameter values to a configuration module that adjusts the settings of one or more intrinsic camera parameters of the image capture device based on the re-estimated intrinsic camera parameter values.

Figure 5:
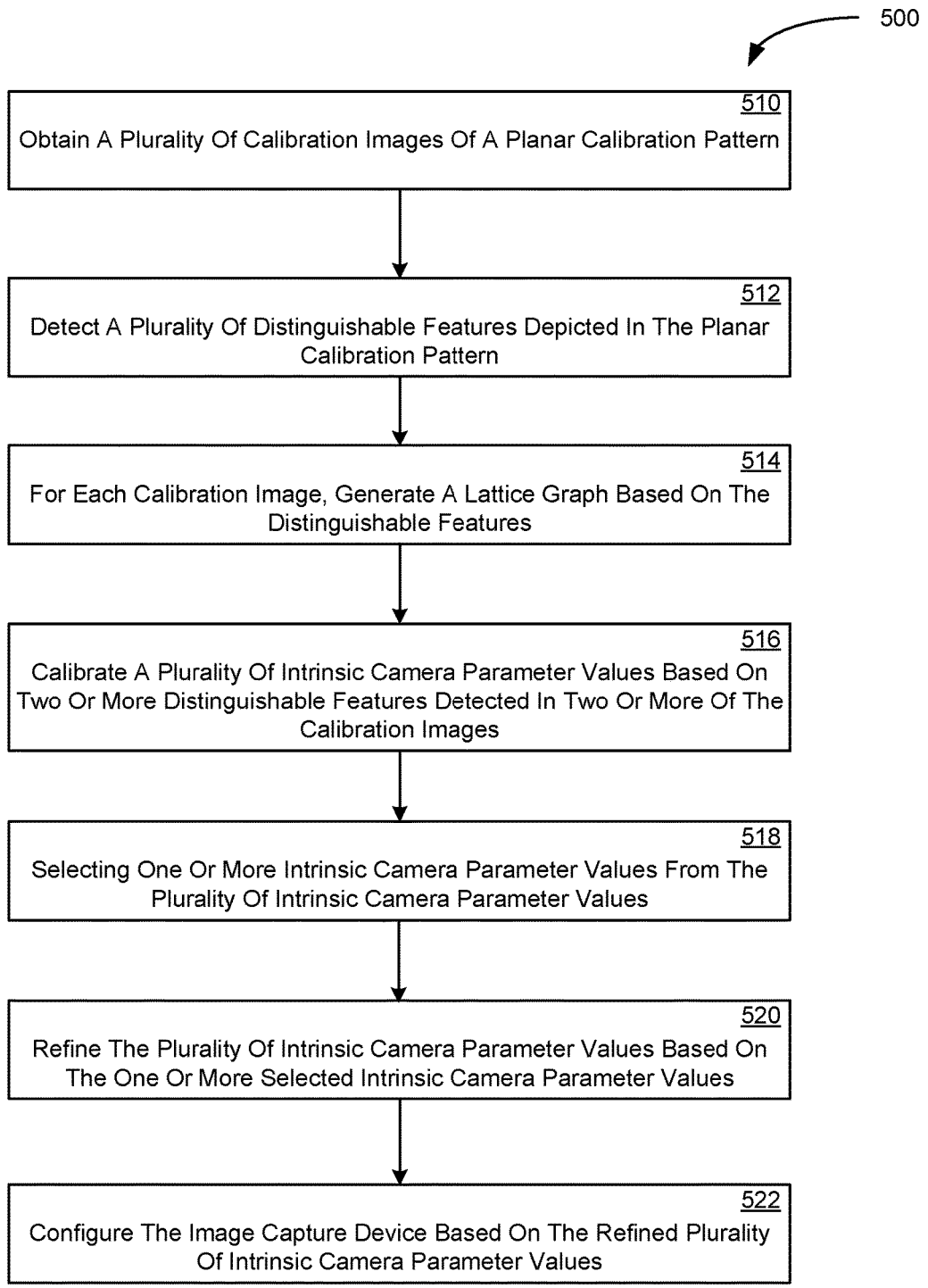
FIG. 5 is a flowchart illustrating a method for automatically determining calibration parameter values of a camera according to some embodiments of the present disclosure.

FIG. 5 illustrates an example method for automatically configuring an image capture device. The method 500 may be performed by a computing unit of the image capture device or a computing unit associated with and in communication with the image capture device.

At 510, the computing unit obtains a plurality of calibration images of a planar calibration pattern. The computing unit may be contained in the form factor of the image capture device. Alternatively, the computing unit may receive the plurality of calibration images via a wired or wireless connection from the image capture device. The captured calibration images may be images taken of the planar calibration pattern taken from different respective angles. It is understood that capturing images from different respective angles may include adjusting the orientation and/or position of the image capture device with respect to the planar calibration pattern, adjusting the orientation and/or position of the planar calibration pattern with respect to the image capture device, or a combination of both.

At 512, the computing unit detects a plurality of distinguishable features depicted in the planar calibration pattern. In embodiments, the computing unit may detect centers of the distinguishable features in every calibration image using a machine vision technique. The computing unit may detect the distinguishing features using a blob detector. In embodiments, the computing unit may implement blob detection techniques such as the Laplacian of Gaussian (LoG) or the Maximally Stable Extremum Regions (MSER) algorithm. The machine vision technique may output, for each calibration image, a list of candidate two-dimensional positions corresponding to the detected features.

At 514, the computing unit generates a lattice graph for each calibration image based on the distinguishable features. In embodiments, the computing unit may reconstruct a lattice graph that supports the distinguishable features' centers in every calibration image. The reconstruction may be robust to the errors made in the previous step as well as to the distortions introduced by the perspective projection and the camera lens. In embodiments, the computing unit implements the RANSAC algorithm to perform the reconstruction. The reconstruction may be performed multiple times, where each reconstruction may begin from a different starting point. After multiple iterations, the computing unit may select and retain the best reconstruction. For each candidate starting two-dimensional detection, the computing unit may compute the n-closest neighbors, where n is the degree of the lattice graph (n can be 4 for the grid of the figures). These neighbors are then sorted with respect to the angle they make relative to the candidate starting two-dimensional detection. The vectors between the neighbors and the starting detection are saved as initial edge vectors. The parameter calibration module 104 may proceed recursively, with each recursion being given as input a current two-dimensional detection, n edge vectors, and a list of already visited detections. The initial recursion starts with the candidate starting two-dimensional detection, the initial edge vectors, and an empty list, as shown in FIG. 4A. Each recursion marks the current two-dimensional detection as visited by adding it to the list. The parameter calibration module 104 may then select the n-closest neighbors to the addition of the current two-dimensional detection plus each edge vector. The parameter calibration module 104 may update the edge vectors to be the vectors between the newly selected n-closest neighbors and the current two-dimensional detection. The computing unit may then recursively explore the neighbors if the neighbors have not been already explored (i.e., if the neighbors are not in the list of already visited detections). The recursion can terminate when the computing unit cannot find any neighbors that have not already been visited. The computing unit may then reconstruct the lattice graph from the recursion, whereby each visited neighbor corresponds to a well-defined direction relative to the initial edge vectors. In embodiments, the parameter calibration module 104 may implement heuristics to increase the robustness of the reconstruction.

At 516, the computing unit calibrates a plurality of intrinsic camera parameter values of one or more intrinsic camera parameters of the image capture device based on two or more distinguishable features detected in two or more of the calibration images. In embodiments, the computing unit may estimate an initial version of the intrinsic camera parameter values, using, for example, the RANSAC algorithm. The computing unit may perform estimation multiple times, each time using only a small subset of the calibration images chosen at random. After the selection of a few of the calibration images, the computing unit may estimate the intrinsic camera parameter values using a computer vision algorithm taking as input a set of two-dimensional and three-dimensional correspondences for a number of images.

The computing unit may derive these correspondences from the lattice graphs reconstructed in the previous step. Indeed, both a two-dimensional position (in the image coordinate system) and a three-dimensional position (in the planar calibration pattern coordinate system) can be associated to every node of every reconstructed lattice graph. In embodiments, the two-dimensional component is the distinguishable features' center. The computing unit may derive a three-dimensional component from the position of the node in the lattice graph with respect to a node arbitrarily chosen as the origin. As the calibration pattern is planar, the computing unit may set one of the three coordinates to zero, and may compute the other two nodes from the path in the lattice graph between the arbitrary origin and the node. After each intrinsic camera parameter estimation trial, the computing unit may compute a quality of the estimation by first solving for the extrinsic camera parameter values of one or more extrinsic camera parameters of the image capture device using the same two and three-dimensional correspondences for every calibration image and the recovered intrinsic camera parameter values. The computing unit may then calculate the reprojection error for each calibration image using, as a quality measure, a suitable robust estimator of the reprojection error (e.g., the median of all the errors).

At 518, the computing unit selects one or more intrinsic camera parameter values from the plurality of intrinsic camera parameter values. The computing unit may select the one or more intrinsic camera parameter values so as to minimize a robust estimator of a reprojection error over the obtained plurality of images. The computing unit may select any calibration images of the obtained calibration images having a reprojection error lower than some threshold. In some embodiments, the threshold may be a few times (e.g., 2× or 3×) the quality measure of the previous step.

At 520, the computing unit refines the plurality of intrinsic camera parameter values based on the one or more selected intrinsic camera parameters. The computing unit may then re-estimate the intrinsic camera parameter values based on the selected calibration images using the same correspondences, as in, for example, the previous step.

At 522, the computing unit configures one or more intrinsic camera parameters of the image capture device based on the refined plurality of intrinsic camera parameter values. Once completed, the computing unit may output the re-estimated intrinsic camera parameters to a configuration module of the image capture device that adjusts the one or more intrinsic camera parameters of the image capture device based on the re-estimated intrinsic camera parameter values.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

Modules and data stores included in the systems represent components that may be included in the systems of the present disclosure. The modules and data stores described herein may be embodied by electronic hardware, software, firmware, or any combination thereof. Depiction of different features as separate modules and data stores does not necessarily, imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data (e.g., records) included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for automatic camera calibration of an image capture device, the method comprising:
    obtaining, by a computing unit, a plurality of images of a planar calibration pattern captured by the image capture device from different respective angles;
    detecting, by the computing unit, a plurality of distinguishable features depicted in the planar calibration pattern for each obtained image;
    for each image, generating, by the computing unit, a respective lattice graph corresponding to the image based on the distinguishable features detected from the image, wherein each respective lattice graph has a plurality of nodes corresponding to distinguishable features and is defined with reference to a global planar coordinate system having an arbitrary origin;
    repeatedly calibrating, by the computing unit, a plurality of intrinsic camera parameter values corresponding to one or more intrinsic camera parameters of the image capture device based on two or more distinguishable features detected in two or more of the images and the lattice graphs corresponding to the two or more images, wherein the calibrating is performed for two or more different combinations of the images, and wherein the repeatedly calibrating comprises, for each image, a plurality of recursions each starting with a single node detected in the image, one or more n-edge vectors and one or more visited directions and continuing via a repeated selection of one or more n-closest neighbors to the one or more n-edge vectors;
    selecting, by the computing unit, one or more intrinsic camera parameter values from the plurality of intrinsic camera parameter values, wherein the one or more intrinsic camera parameter values are selected to minimize a robust estimator of a reprojection error over the obtained plurality of images; and
    refining, by the computing unit, calibration of the plurality of intrinsic camera parameter values based on the one or more selected intrinsic camera parameters.

2. The method of claim 1, further comprising, repeated calibrating a plurality of extrinsic camera parameter values using two and three-dimensional correspondences for the calibration images and the plurality of intrinsic camera parameter values, wherein the repeated calibrating is performed for two or more different combinations of obtained images.

3. The method of claim 1, wherein obtaining the plurality of images includes obtaining a video containing the plurality of images.

4. The method of claim 1, wherein the plurality of images is a series of standstill images.

5. The method of claim 1, wherein the plurality of images is captured by the image capture device, wherein the computing unit is contained in a form factor of the image capture device.

6. The method of claim 1, wherein the plurality of images is captured by the image capture device and received by the computing unit via a network.

7. The method of claim 1, wherein detecting the plurality of distinguishable features includes, for each image, performing a blob detection process on the image.

8. The method of claim 7, wherein the blob detection process is Laplacian of Gaussian.

9. The method of claim 7, wherein the blob detection process is Maximally Stable Extremum Regions.

10. The method of claim 1, wherein each node of the lattice graph is based on a respective center of a respective distinguishable feature of the plurality of distinguishable features.

11. The method of claim 1, wherein refining the plurality of intrinsic camera parameter values is further based on all images of the plurality of obtained images that correspond to the one or more selected intrinsic camera parameter values.

12. The method of claim 1, further comprising configuring the one or more intrinsic camera parameters of the image capture device in accordance with the refined plurality of intrinsic camera parameter values.

13. The method of claim 1, wherein the one or more intrinsic camera parameters include focal lengths, skew, optical center, and/or radial distortion coefficients.

14. A computing unit configured for automatic camera calibration of an image capture device, the computing unit comprising:
    memory storing a plurality of computer-executable instructions; and one or more processors that execute the computer-executable instructions, the computer-executable instructions causing the one or more processors to:

obtain a plurality of images of a planar calibration pattern captured by the image capture device from different respective angles;

detect a plurality of distinguishable features depicted in the planar calibration pattern for each obtained image;

generate a lattice graph having a plurality of nodes based on the distinguishable features detected from each image, the lattice graph being generated with reference to a global planar coordinate system having an arbitrary origin;

repeatedly calibrate a plurality of intrinsic camera parameter values corresponding to one or more intrinsic camera parameters of the image capture device based on two or more distinguishable features detected in two or more of the images and the lattice graphs corresponding to the two or more images, wherein the calibrating is performed for two or more different combinations of the images, and wherein to repeatedly calibrate comprises, for each image, a plurality of recursions each starting with a single node detected in the image, one or more n-edge vectors and one or more visited directions and continuing via a repeated selection of one or more n-closest neighbors to the one or more n-edge vectors;

select, one or more intrinsic camera parameter values from the plurality of intrinsic camera parameter values, wherein the one or more intrinsic camera parameter values are selected to minimize a robust estimator of a reprojection error over the obtained plurality of images; and refine calibration of the plurality of intrinsic camera parameters based on the one or more selected intrinsic camera parameters.

15. The computing unit of claim 14, wherein obtaining the plurality of images includes obtaining a video containing the plurality of images.

16. The computing unit of claim 14, wherein the plurality of images is a series of standstill images.

17. The computing unit of claim 14, wherein the plurality of images is captured by the image capture device, and wherein the computing unit is integrated in a form factor of the image capture device.

18. The computing unit of claim 14, wherein the plurality of images is captured by the image capture device and received by the computing unit via a network.

19. The computing unit of claim 14, wherein detecting the plurality of distinguishable features includes, for each image, performing a blob detection process on the image.

20. The computing unit of claim 19, wherein the blob detection process is Laplacian of Gaussian.

21. The computing unit of claim 19, wherein the blob detection process is Maximally Stable Extremum Regions.

22. The computing unit of claim 21, wherein each node of the lattice graph is based on a respective center of a respective distinguishable feature of the plurality of distinguishable features.

23. The computing unit of claim 21, wherein refining the plurality of intrinsic camera parameter values is further based on all images of the plurality of obtained images that correspond to the one or more selected intrinsic camera parameter values.

24. The computing unit of claim 14, wherein the computer-executable instructions further cause the one or more processors to configure the one or more intrinsic camera parameters of the image capture device in accordance with the refined plurality of intrinsic camera parameter values.

25. The computing unit of claim 14, wherein the computer-executable instructions further cause the one or more processors to repeatedly calibrate a plurality of extrinsic camera parameter values of one or more extrinsic camera parameters of the image capture device using two and three-dimensional correspondences for the calibration images and the plurality of intrinsic camera parameter values, wherein the repeated calibrating is performed for two or more different combinations of obtained images.

26. The computing unit of claim 14, wherein the one or more intrinsic camera parameters include focal lengths, skew, optical center, and/or radial distortion coefficients.

27. A method for automatic calibration of an image capture device, the method comprising:

obtaining, by a computing unit, a plurality of images of a planar calibration pattern captured by the image capture device, at least a portion of the plurality of images being captured from different respective angles;

detecting, by the computing unit, a plurality of distinguishable features depicted in the planar calibration pattern for each obtained image;

for each image, generating, by the computing unit, a respective lattice graph corresponding to the image based on the distinguishable features detected from the image, wherein each respective lattice graph is generated with reference to a global planar coordinate system having an arbitrary origin;

repeatedly calibrating, by the computing unit, a plurality of camera parameter values corresponding to one or more camera parameters of the image capture device based on two or more distinguishable features detected in two or more of the images and the lattice graphs corresponding to the two or more images;

selecting, by the computing unit, one or more camera parameter values from the plurality of camera parameter values, wherein the one or more camera parameter values are selected based on a robust estimator of a reprojection error over the obtained plurality of images; and refining, by the computing unit, calibration of the plurality of camera parameter values based on the one or more selected camera parameters.

28. The method of claim 27, further comprising, repeatedly calibrating a second plurality of camera parameter values using at least one of two-dimensional and three-dimensional correspondences for the calibration images and the plurality of camera parameter values.

29. The method of claim 27, wherein each respective lattice graph has a plurality of nodes corresponding to distinguishable features and wherein each node of the plurality of nodes is based on a respective center of a corresponding distinguishable feature.

30. The method of claim 27, wherein the repeatedly calibrating comprises, for each image, a plurality of recursions each starting with a single node detected in the image, one or more n-edge vectors and one or more visited directions and continuing via a repeated selection of one or more n-closest neighbors to the one or more n-edge vectors.

* * * * *